United States Patent [19]

Weeks

[11] Patent Number: 5,164,255
[45] Date of Patent: Nov. 17, 1992

[54] NONWOVEN PREFORM SHEETS OF FIBER REINFORCED RESIN CHIPS

[75] Inventor: Gregory P. Weeks, Hockessin, Del.

[73] Assignee: E. I. Du Pont de Nemours and Company, Wilmington, Del.

[21] Appl. No.: 789,488

[22] Filed: Nov. 12, 1991

Related U.S. Application Data

[63] Continuation of Ser. No. 400,405, Aug. 31, 1989, abandoned.

[51] Int. Cl.$^5$ .............. D04H 00/00; D02G 3/00; B32B 9/00; B32B 5/06
[52] U.S. Cl. ................. 428/294; 428/292; 428/297; 428/298; 428/302; 428/303; 428/332; 428/364; 428/365; 428/375; 428/378; 428/401; 428/408; 428/902
[58] Field of Search .......... 428/294, 292, 295, 232, 428/902, 408, 213, 297, 298, 302, 303, 332, 364, 365, 375, 378, 401

[56] References Cited

U.S. PATENT DOCUMENTS

| | | | |
|---|---|---|---|
| 3,369,843 | 2/1968 | Prew | 301/63 |
| 3,490,983 | 1/1970 | Lee | 428/294 |
| 3,686,048 | 8/1972 | Schirtzinger | 428/232 |
| 4,294,490 | 10/1981 | Woelfel | 301/63 |
| 4,339,490 | 7/1982 | Yoshioka | 428/213 |
| 4,432,916 | 2/1984 | Logan | 264/24 |
| 4,640,861 | 2/1987 | Binnersley et al. | 428/295 |
| 4,818,582 | 4/1989 | Gilgrass | 428/294 |
| 4,820,568 | 4/1989 | Harpell et al. | 428/294 |
| 4,857,385 | 8/1989 | Armiger et al. | 428/292 |
| 4,863,780 | 9/1989 | Armiger et al. | 428/292 |
| 4,883,700 | 11/1989 | Harpell et al. | 428/294 |

FOREIGN PATENT DOCUMENTS

2117388 10/1983 United Kingdom .

*Primary Examiner*—George F. Lesmes
*Assistant Examiner*—James D. Withers

[57] ABSTRACT

A nonwoven planar preform sheet for a polymer composite consisting of 20% to 80% by weight reinforcing fibers and 20% to 80% by weight matrix resin, the reinforcing fibers being from ⅛ to 6 inches in length from 1 to 50 micrometers in diameter, and being arrayed in the composite as chips of from 2 to 5000 parallel filaments, each substantially uniformly coated with matrix resin, all of the filaments of each chip ending in a single plane orthogonal to the filament direction, where the thickness of the chips is from 1 to 50 filament diameters and the length to thickness ratio is greater than 100. The chips may be either randomly oriented or oriented in the same direction in the plane of the sheet.

11 Claims, 1 Drawing Sheet

NONWOVEN PREFORM SHEETS OF FIBER REINFORCED RESIN CHIPS

This is a continuation, of application Ser. No. 07/400,405 filed Aug. 31, 1989, now abandoned.

BACKGROUND OF THE INVENTION

This invention relates to fiber reinforced preform sheets for compression molding and molded parts therefrom. More particularly, it relates to such sheets formed from chips of substantially parallel filaments coated with thermoplastic resin.

Fiber reinforced thermoplastic composite preform sheets for compression flow molding applications are well known in the art. During processing, the preform sheets are heated to a temperature which melts the matrix resin and placed in a compression molding tool. The tool surface is held below the matrix resin melt temperature. The tool is rapidly closed and pressure applied to flow the material and fill out the mold. Pressure is maintained for a specified dwell time to solidify the matrix resin, after which the finished part is ejected. Typically, the preform sheet used in such applications is sized to cover between 40 and 90% of the mold surface area, the remainder to be filled by flow during the compression cycle.

Known methods for making flow moldable composite preforms include layering alternate sheets of random reinforcing materials with polymer films followed by heating and cooling under pressure to form an integrated solid sheet, extrusion of molten polymer onto sheets of random reinforcing materials followed by heating and cooling under pressure to form an integrated solid sheet, and blending of polymeric powders and latexes with reinforcing fibers using a paper making process to form a nonwoven mat which can be further heated and cooled under pressure to form a solid integrated sheet.

This invention is concerned with composite preform sheets which are intended for heating prior to molding by radiant or contact means such that the bulk thermal conductivity of the sheet is an important factor for efficient processing. Such preform sheets generally take the form of well consolidated, low void content sheet structures. Consolidation under pressure is required to overcome the lofting force of the reinforcing fibers, to wet the fibers with matrix resin, and to remove air and voids in the structure which hinder thermal conductivity.

When consolidated preform sheets of the known prior art are reheated prior to molding, the composite sheet will reloft again to typically 2 to 10 times its compressed thickness as the matrix resin approaches and passes its melt temperature. This lofting results in a substantial loss of thermal conductivity during the heating process (due to the incorporation of voids) causing loss of heating efficiency and requiring longer duration heating. Often the time/temperature cycle leads to thermal degradation of the matrix polymer.

SUMMARY OF THE INVENTION

A nonwoven planar preform sheet has been developed for fiber reinforced resin articles which surprisingly lofts substantially less than two times its compressed thickness as the matrix resin approaches and passes melt temperature. This is less than the amount of lofting experienced with the preforms of the prior art and results in improved thermal conductivity to improve heating efficiency during the heating cycle prior to molding. The present invention enables higher fiber volume loading of the sheet preform than has previously been obtainable. The preform sheet of this invention comprises plurality chips bonded to each other and lying substantially in the plane of the sheet. Each of the chips comprises from about 20 to about 80 percent by weight of substantially parallel continuous filaments coated with from about 20 to about 80 percent by weight with a resin. Each chip comprises from 2 to about 5000 filaments (preferably 100 to 3000 filaments) with a range in diameter from 1 to about 50 micrometers and having a length in the range from about ⅛ to about 6 inches. Each chip preferably is rectangular in shape having a thickness of from 1 to about 50 filament diameters with a length to thickness ratio greater than 100. The chips may be either randomly oriented or substantially oriented in the same direction in the plane of the sheet.

Suitable thermoplastic resinous materials which may be used as a resin matrix include, but are not limited to, polypropylene amorphous polyamides, polyether ketone ketones, polyether ether ketones, and amorphous or crystalline polyesters.

The resin of choice is reinforced with fibers as, for example, carbon fibers, glass fibers, thermoplastic fibers and aramid fibers.

DETAILED DESCRIPTION OF THE PREFERRED EMBODIMENT

Figure 1:
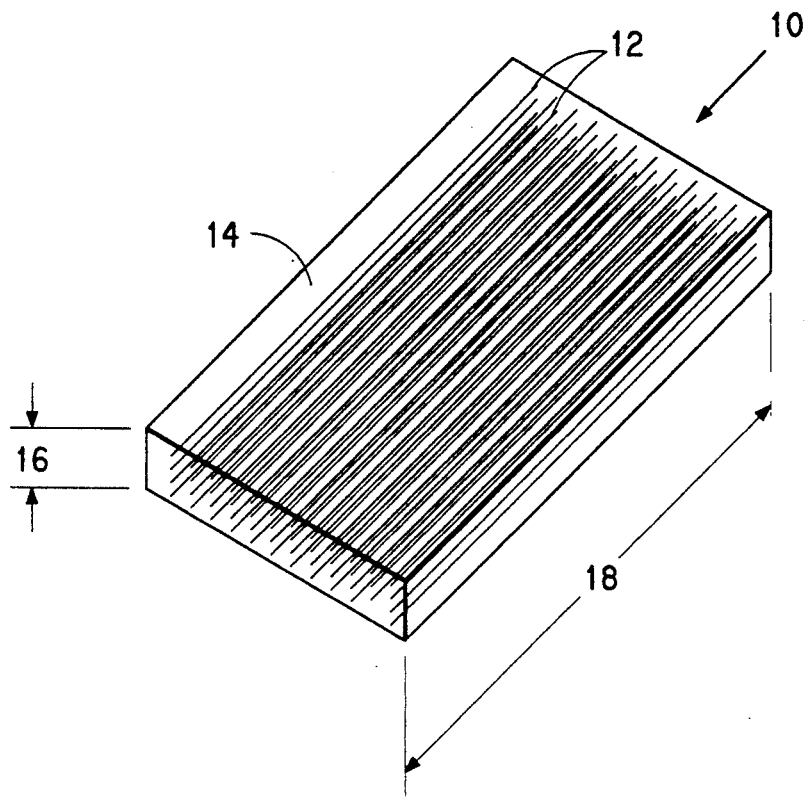
FIG. 1 is a schematic perspective illustration greatly enlarged of a chip used to form the nonwoven sheet.
Figure 1:
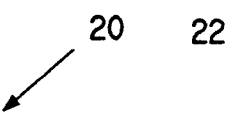
Figure 2:
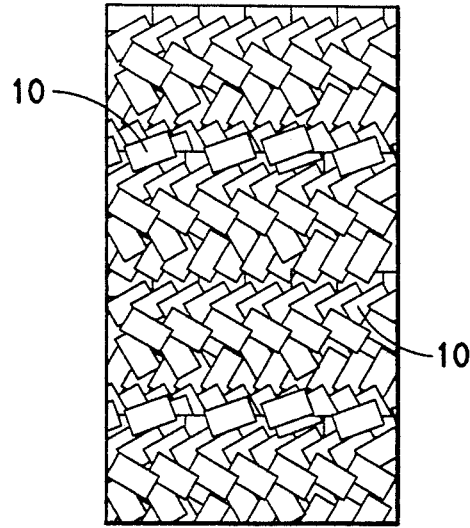
FIG. 2 is a schematic plan view of a nonwoven planar sheet preform of this invention showing the chips randomly oriented in the plane of the sheet.
Figure 3:
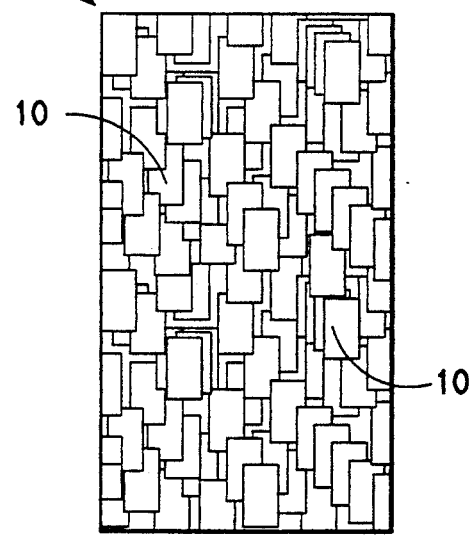
FIG. 3 is a schematic plan view of a nonwoven planar sheet preform of this invention showing the chips oriented in the same direction in the plane of the sheet.

Referring to FIGS. 1–3, it can be seen that in the embodiment chosen for purposes of illustration the chip used to form the preform sheets of this invention is designated by the numeral 10. Each chip 10 comprises from about 20 to about 80 percent by weight of substantially parallel continuous filaments 12 coated with from about 20 to about 80 percent by weight with a resin 14. The chips may be formed by cutting the product made using the process described in U.S. Pat. No. 4,640,861 which is incorporated herein by reference. The filaments 12 are from 1 to about 50 microns in diameter and from about ⅛ to about 6 inches in length. There may be anywhere from 2 to 5000 filaments in each chip. The thickness 16 of the chip may be in the range of from about 1 to about 50 filament diameters and has a length 18 to thickness 16 ratio greater than 100.

FIGS. 2 and 3 show the chips 10 bonded to each other (by heating and applying a slight pressure) to form planar unitary sheets 20, 22 respectively. In FIG. 2 the chips 10 are randomly oriented in the plane of sheet 20 while in FIG. 3 the chips 10 are oriented in the same direction.

EXAMPLE 1

Fiber glass strand produced by Owens-Corning Fiberglass Corporation, Toledo, Ohio (designated 473 CB 675 Type 30 roving, composed of 2000 E-glass filaments, each 13 microns in diameter having 4.8% elongation and 300,000 psi (9.38 gms./denier) tensile strength), was coated with polyethylene terephthalate (PET) having a molecular weight of approximately 25,000 number average.

The PET was compounded with additives: 5% Americhem 18589-R1 (Americhem Inc., Cuyahoga Falls, Ohio 44221) and 0.3% Irganox-1010 (Ciba-Geigy Plastics and Additives Division, Hawthorne, N.Y. 10532). The coating impregnation system is described in U.S. Pat. No. 4,640,861.

The resulting impregnated tow was 50% by volume polyethylene terephthalate and 50% by volume glass fibers and showed good polymer coating in and around the majority of individual filaments in the strand bundle. The finished impregnated strand thickness was 0.012 inches thick and 0.220 inches in width.

The impregnated tow was then chopped into 1.125 inch lengths using a chopper gun (model B-210, manufactured by Glas-Craft, Inc., Indianapolis, Ind. 46278). The chopper gun was mounted on a programable robot (type 760 RO S5, Westinghouse Unimation, Inc., Pittsburgh, Pa. 15238).

The strand was chopped at the rate of approximately 500 yards/minute and deposited randomly onto a 25"×36" 30×28 mesh stainless steel, Teflon ® coated wire (0.013" warp and shute) screen supported on a large vacuum blower table connected to a blower system capable of pulling 950 cfm over a 12 sq. ft. area. This created a loose mat of chips of basis weight approximately 0.34 pounds per square foot.

The mat, supported by the wire mesh, covered with a Teflon ® coated glass woven protective cover sheet (sold by Release Ease #234, Artech Corporation, Atlanta, Ga.) was then transferred between the preheated plattens of fusion press (serial #480, Reliant Tooling Company, Ltd., Richmansworth). Platten temperature was 280° C. (top platten only). The mat was pressed for 30 seconds at a pressure of 7 psi and removed from the press. The resulting sheet was composed of chopped strand chips still substantially retaining their original dimensions but being tacked together and lying substantially in the plane of the sheet, randomly oriented. The resulting sheet thickness was approximately 0.06 inches.

Blanks were cut from this sheet measuring 7×7 inches. Several such blanks having a total weight of about 1.0 pounds were placed in a Fostoria quartz tube IR oven (model 1980-083, Fostoria Ind., Fostoria, Ohio 44830) at a distance of 6 inches from tube array for 105 seconds with the variable power setting at 100%. Under these conditions the temperature at the center was raised to 280° C. as measured using thermocouples, causing the polymer to melt. This resulted in a temperature at the surface of the blank of 300°-320° C. measured in the same manner. The thickness of the molten sheet was measured by first quenching a separate sample in a bucket of water to fix the lofted height and assessing the thickness at several locations using a micrometer. Comparing this measurement with initial thickness of the sheet prior to heating, lofted height was within 10% of the initial thickness. The heated sheets were stacked by hand with the help of a spatula and transferred to a steel male-female compression molding tool having the shape of an open box of dimensions 8×8×2.25 inches (produced by Quality-Kellering, Kent, Ohio 44240) with a wall thickness of 0.125 inches. The mold surface was held at 150° C. (bottom) and 160° C. (top) via a Sterlco oil heater (model F6026-D, Sterling, Inc., Milwaukee, Wis.) supplying heated fluid to core channels suitably located in the mold body. The box tool was installed in a Schuler hydraulic press (model 4C-100%, Schuler, Inc., Columbus, Ohio 43207). Transfer time was 20 seconds from removal of the charge from IR oven until the tool closed. A pressure of 2500 psi (based on the projected area of the QC box) was applied for a dwell time of 30 seconds, after which the solidified part was removed from the mold. It was observed that the charge material flowed to completely fill out the part resulting in a desirable smooth surface.

EXAMPLE 2

The procedure for Example 2 is similar in most respects to Example 1 with the exception that the chips were created by first coating Kevlar ® aramid fiber, Du Pont type 965, 1150 denier strand with Bexloy ® amorphous polyamide resin in the same manner established in Example 1. Following coating, the coated strand was chopped in a similar manner to form a mat of basis weight 0.210 pounds per square foot where the individual chips were 1.0 inch in length, 0.10 inch wide, and 0.005 inches thick. After hot pressing at 7 psi, the average sheet thickness was approximately 0.060 inches. Blanks cut from this sheet were infrared heated using the same equipment described in Example 1. After heating to 245° C. (center), lofted sheet thickness was within 10% of the original cold sheet thickness, measured using the same method in Example 1. A pressure of 2500 psi (based on the projected area of the QC box) was applied for a dwell time of 30 seconds, after which the solidified part was removed from the mold. Mold temperature was 110° C. (top) and 100° C. (bottom). It was observed that the charge material flowed to partially completely fill out the part.

EXAMPLE 3

The procedure for Example 3 is similar in most respects to Example 1 with the exception that the chips were created by first coating Magnamite carbon fiber, type 4A4-3K, 1971 denier, 3000 filament strand (Hercules, Inc.) with Bexloy ® amorphous polyamide resin in the same manner established in Example 1. Following coating, the coated strand was chopped in the same manner to form a chip sheet of basis weight 0.167 pounds per square foot where the individual chips were 0.625 inches in length, 0.225 inches wide and 0.010 inches thick. After hot pressing at 7 psi, the average sheet thickness was 0.045 inches. Blanks cut from this sheet were infrared heated using the same equipment described in Example 1. After heating to 229° C., lofted sheet thickness was within 10% of the original cold sheet thickness. A pressure of 2500 psi (based on the projected area of the QC box) was applied for a dwell time of 30 seconds after which the solidified part was removed from the mold. It was observed that the charge material flowed to completely fill out the part resulting in a desirable smooth surface.

EXAMPLE 4

Fiber glass strand composed of 105 glass filament tow, each filament being 0.9 mil diameter, were coated with polypropylene resin consisting of a 50/50 blend of Fusabond polypropylene from Du Pont of Canada and Shell 7.5 melt flow index homopolymer polypropylene. The coating was accomplished using the coating impregnation system described in copending U.S. patent application, Ser. No. 07/271,151 of common assignee.

The resulting impregnated tow was 40% by weight polypropylene and 60% by weight glass fibers and showed good polymer coating in and around the majority of individual filaments in the strand bundle. The finished impregnated strand thickness was 0.05 inch wide and 0.1 inch thick. The impregnated tow was then chopped into 2.0 inch lengths using a chopper gun (model B-210 manufactured by Glas-Craft, Inc., Indianapolis, Ind. 46278). The chopper gun was mounted on a programmable robot (Unimate Puma, type 760 RO S5, Westinghouse Unimation, Inc., Pittsburgh, Pa. 15238). The strand was chopped at the rate of approximately 500 yards per minute and deposited randomly onto a 25×36 inches, 30×28 mesh stainless steel, Teflon ® coated wire (0.013 warp and shute) screen supported on a large vacuum blower table connected to a blower system capable of pulling 950 cfm over a 12 square foot area.

This created a loose mat of chips of basis weight approximately 0.215 pound per square foot and 0.045 inch in thickness.

The mat, supported by the wire mesh, covered with a Teflon ® coated glass woven protective cover sheet sold as Release Ease #234 by Artech Corporation, Atlanta, Ga., was then placed between the preheat platten of a Reliant Service #480 fusion press (Reliant Tooling Company, Ltd., Richmansworth). Platten temperature was 165° C. (top platten only). The sheet was pressed for 30 seconds at a pressure of 7 psi and removed from the press. The resulting sheet was composed of chopped strand chips still substantially retaining their original dimensions but being tacked together and lying substantially in the plane of the sheet. The resulting sheet thickness was 0.045 inch.

Blanks were cut from this sheet measuring 7×7 inches. Several such blanks having a total weight of about 1.0 pound were placed in a quartz tube IR oven (model 1980-083, Fostoria Industries, Fostoria, Ohio 44830) at a distance of 6 inches from tube array for 120 seconds with the variable power setting at 100%. Under these conditions the temperature at the center of the sheets was raised to 200° C. as measured using a thermocouple causing the polymer to melt. This resulted in a temperature at the surface of the blank of 220°-250° C. measured in the same manner. The thickness of the molten sheet was measured by first quenching a sample molten blank as in Example 1. Comparing this measurement with initial thickness of the sheet prior to heating, lofted height was 10–30% greater than the initial thickness. The several heated sheets were stacked by hand with the help of a spatula and transfer to a steel male-female compression molding tool having the shape of an open box of dimensions 8×8×2.25 inches (products by Quality-Kellering, Kent, Ohio 44240). The mold surface was held at 50° C. (bottom) and 60° C. (top) via an oil heater (model F6026-D, serial #57460, elem. diag. #D682-030792, Sterrling, Inc., Milwaukee, Wis.) supply heated fluid to core channels located in the mold body. The box tool was installed in a hydraulic press (model 4C-100T, Schuler, Inc., Columbus, Ohio 43207). Transfer time was 20 seconds from removal of the charge from IR oven until the tool closed. A pressure of 2000 psi (based on the projected area of the box) was applied for a dwell time of 30 seconds, after which the solidified part was removed from the mold. It was observed that the charge material flowed to completely fill out the part resulting in a desirable smooth surface.

EXAMPLE 5

Example 5 is equivalent to Example 4 except that the chop length was 1 versus 2 inches. maximum lofting was 10–30% of initial thickness.

EXAMPLE 6

Example 6 is equivalent to Example 4 except that the chop length was 4 versus 2 inches. maximum lofting was 10–40% of initial thickness.

EXAMPLE 7

Example 7 is equivalent to Example 4 except that the chip was 55% by weight polypropylene and 45% by weight glass. Maximum lofting was 10 to 30% of initial thickness.

EXAMPLE 8

An oriented chopped tow sheet was prepared as follows: bobbins of continuous glass fiber tow were coated as in Example 4 and wound on bobbins. Each bobbin of material weighed approximately 10 pounds (10 inch width, 3 inch I.D. paper tube core, 12 degree winding Helix angle). A surfactant solution consisting of 0.3% Duponol ® WAQ (Du Pont Company, Wilmington, Del. 19898) in deionized water was prepared separately. The bobbins were soaked for 1 minute briefly in this solution to ensure good wet out of the wound coated fiber strand through the thickness of the wound bobbin. The packages were then dried in a convection oven at 150° F. for 24 hours. This treatment imparted a conductance level of approximately 100+ −20 picosiemens to strand material as measured by applying a 1000 volt differential across 1.0 inches of preconditioned strand. The strand to be measured was preconditioned by exposing it to steam rising from a flask of boiling water for 10 seconds. The strand was then attached to the terminals of a conductance meter, model CX (Logan Electronics) within a few seconds of preconditioning and a conductivity reading is taken 2 seconds after initiation of the differential voltage. Thirteen 10 pound bobbins were positioned on a rolling take-off creel and processed to form an oriented mat using the equipment described in U.S. Pat. No. 4,432,916 assigned to Morrison and Knudsen Company, Inc., which is incorporated herein by reference. The electric field was provided by holding a differential of 7500 volts/inch between polished chrome electrodes positioned 21 inches apart suitably located under the deposition belt noted in the figure. A 30 inch width mat was deposited onto masonite caul plates covered with Teflon ® release cloth in several passes under the deposition belt to attain a final mat basis weight of 0.46 pound per square foot.

The caul plate with the mat material are then carefully transported between the 4'×8' platens of a Tyler pneumatic fusing press. The temperature of both platens was 170° C. 50 psi pressure was applied to the mat for 60 seconds between Teflon ® coated glass release cloths. The resulting sheet was composed of chopped strand chips still substantially retaining their original dimensions but being tacked together and lying substantially in the plane of the sheet. The degree of orientation was estimated measuring the sound velocity ratio parallel and perpendicular to the direction of orientation of the chips. Sound velocity was measured using a model 239A portable stress wave timer (Metriguard, P. O. Box 399, Pullman, Wash. 99163). The square of the measured travel time in the perpendicular direction divided by the square of the measured travel time in the parallel direction was greater than 30 indicating a very high degree of chip orientation. The resulting sheet thickness was approximately 0.09 inches.

Blanks were cut from this sheet measuring 7×7 inches. Several such blanks having total weight of about 1.0 pound were placed in a quartz tube IR oven (model 1980-083, Fostoria Industries, Fostoria, Ohio 44830) at a distance of 6 inches from tube array for 120 seconds with the variable power setting at 100%.

Under these conditions the temperature at the center of sheets was raised to 200° C. as measured using thermocouples causing the polymer to melt. This resulted in a temperature at the surface of the blank of 220°–250° C. measured in the same manner. The thickness of the molten sheet was measured by first quenching a sample molten blank as in Example 1. Comparing this measurement with initial thickness of the sheet prior to heating, lofted height was 10–30% greater than the initial thickness. The several heated sheets were stacked by hand in a quasi-isotropic (0+ −45,90) configuration with the help of a spatula and transferred to a steel male-female compression molding tool having the shape of an open box of dimensions 8×8×2.25 inches (produced by Quality-Kellering, Kent, Ohio 44240). The mold surface was held at 50° C. (bottom) and 60° C. (top) via model F6026-D, serial #57460, elem. oil heater supply heated fluid to core channels located in the mold body. The box tool was installed in a hydraulic press (model 4C-100T, Schuler, Inc., Columbus, Ohio 43207). Transfer time was 20 seconds from removal of the charge from IR oven until the tool closed. A pressure of 2000 psig (based on the projected area of the box) was applied for a dwell time of 30 seconds after which the solidified part was removed from the mold. It was observed that the charge material flowed to completely fill out the part resulting in a desirable smooth surface.

What is claimed is:

1. A compressed nonwoven planar preform sheet for a fiber reinforced resin article consisting essentially of: a plurality of chips bonded to each other lying substantially in the plane of the preform sheet, each of said chips comprising from 20 to 80 percent by weight of from 2 to about 5000 substantially parallel continuous filaments coated with from about 20 to about 80 percent by weight of a thermoplastic resin, said filaments having a diameter of from about 1 to about 50 micrometers, each of said chips having a thickness of from 1 to about 50 filament diameters with a length to thickness ratio greater than 100 whereby said sheet lofts substantially less than two times its compressed thickness as said resin approaches and passes melt temperature.

2. The nonwoven sheet as defined in claim 1 wherein said chips are randomly oriented in the plane of the sheet.

3. The nonwoven sheet as defined in claim 1 wherein said chips are substantially oriented in the same direction in the plane of the sheet.

4. The nonwoven sheet as defined in claim 1 wherein each chip comprises from about 100 to about 3000 filaments, said filaments having a diameter of from about 1 to 50 micrometers, each of said chips having a thickness of from 1 to about 50 filament diameters with a length to thickness ratio greater than 100.

5. The nonwoven sheet as defined in claims 1, 2, 3 or 4 wherein said filaments are glass fiber and said resin is polypropylene.

6. The nonwoven sheet as defined in claims 1, 2, 3 or 4 wherein said filaments are carbon fiber and said resin is polyester.

7. The nonwoven sheet as defined in claims 1, 2, 3 or 4 wherein said filaments are aramid fibers and said resin is an amorphous polyamide.

8. A compression molded article from the nonwoven sheet as defined in claims 1, 2, 3 or 4.

9. A compression molded article from the nonwoven sheet as defined in claim 5.

10. A compression molded article from the nonwoven sheet as defined in claim 6.

11. A compression molded article from the nonwoven sheet as defined in claim 7.

* * * * *